Dec. 21, 1948.    R. A. BAUDRY    2,456,612
DYNAMOELECTRIC MACHINE
Filed June 19, 1947    2 Sheets-Sheet 1

WITNESSES:

INVENTOR
René A. Baudry.
BY
ATTORNEY

Dec. 21, 1948. R. A. BAUDRY 2,456,612
DYNAMOELECTRIC MACHINE
Filed June 19, 1947 2 Sheets-Sheet 2

WITNESSES:
E. A. M°Closkey
Nw. C. Groome

INVENTOR
René A. Baudry.
BY
ATTORNEY

Patented Dec. 21, 1948

2,456,612

UNITED STATES PATENT OFFICE 2,456,612

DYNAMOELECTRIC MACHINE

René A. Baudry, Wilkinsburg, Pa., assignor to Westinghouse Electric Corporation, East Pittsburgh, Pa., a corporation of Pennsylvania Application June 19, 1947, Serial No. 755,697

6 Claims. (Cl. 171—252)

The present invention relates to the construction of dynamo-electric machines, and more particularly to a spring mounting for the stator members of dynamo-electric machines which are subject to high transient torques.

The invention is especially applicable to large alternating-current generators which are to be used for testing circuit breakers, although it will be obvious that its usefulness is not necessarily restricted to this particular application. In testing circuit breakers, the breaker to be tested is usually connected directly across a generator, so that the generator supplies a heavy current to the breaker in order to determine if the breaker has the desired interrupting capacity. Obviously, when the circuit breaker is closed, the generator is subjected to a direct short-circuit across its terminals, and a very high transient torque occurs in the generator. Thus, a generator used for circuit breaker testing is subject to repeated high transient torques, and to sudden reversals of torque, as the breaker is closed and opened. If the generator is rigidly secured to its supporting structure and foundation, as in the conventional practice, the torque reaction is transmitted to the supporting structure and to the foundation, and these parts are subjected to suddenly applied high stresses which, in effect, are essentially impact stresses. The repeated application of stresses of this nature to the supporting structure and foundation may result in damage to the supporting structure or the foundation bolts, and eventual loosening of the machine on its foundation, or failure of parts of the supporting structure.

The principal object of the present invention is to provide a dynamo-electric machine which is capable of withstanding repeated high transient torques without damage and without undesirable stresses in any part of the machine or its supporting structure.

Another object of the invention is to provide a dynamo-electric machine which is capable of withstanding repeated high transient torques and sudden torque reversals without subjecting the supporting structure or foundation to impact stresses or unreasonably high stresses.

A further object of the invention is to provide a dynamo-electric machine in which the stator member is supported on springs which cushion and absorb the abrupt torque reactions resulting from high transient torques and thus prevent the application of impact stresses to the supporting structure.

A more specific object of the invention is to provide a dynamo-electric machine in which the stator member is supported on springs to permit limited movement of the stator member relative to the supporting structure, so that the torque reactions resulting from high transient torques, or sudden torque reversals, are absorbed by the springs, and in which guide means are provided to restrict the movement of the stator member to rotary movement, so as to prevent changes in the airgap which might occur in the absence of any restraining means, due to the magnetic forces acting on the stator or as a result of movement of the stator in response to the occurrence of a transient torque.

The invention will be more fully understood from the following detailed description, taken in connection with the accompanying drawings, in which.

Figure 1:
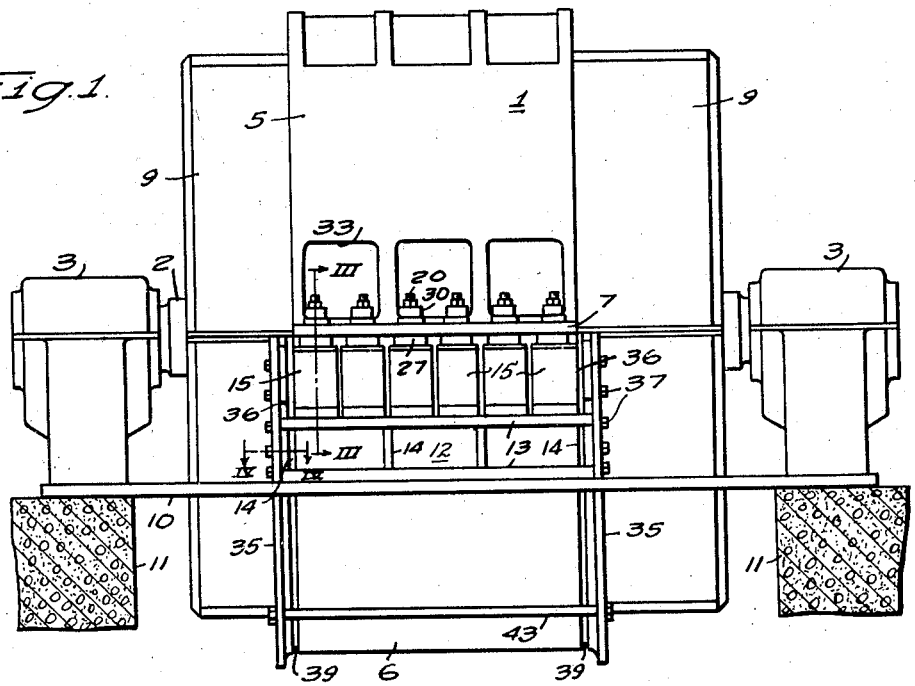
Figure 1 is a view in side elevation of a generator embodying the invention.

The invention is shown in the drawings embodied in a large alternating-current generator intended for use in testing circuit breakers, although it will be apparent that the invention may also be applied to other types of machines where high transient torques may be encountered.

The generator shown in the drawings has a stator member, generally indicated at 1, and a rotor member 2 supported in bearings 3. The rotor member 2 may be of any suitable type. In the particular embodiment shown, the stator member 1 is built up, in a more or less usual manner, of frame rings 4 on which a laminated core with the usual stator windings is supported. The upper part of the stator member 1 is closed by an upper cover member 5, while the lower part is closed by a cover member 6 fitting over the frame rings 4. A frame foot member 7 is provided at each side of the stator member 1 for supporting the stator, and the upper cover 5 preferably extends to the outer edge of the foot member 7, as clearly shown in Fig. 3. The ends of the stator member are closed by end rings 8 and end bells 9.

The machine is supported on sole plates 10 which may be secured in any suitable manner to a foundation 11. The bearings 3 for the rotor member may be directly mounted on the foundation 11, or on the sole plates 10. The stator member 1, however, is spring mounted on the sole plates. In the particular embodiment shown, the stator member 1 is carried on foot members 12 which are secured to the sole plates 10 on each side of the machine. Each of the foot members 12 consists of two spaced horizontal plates 13 separated and reinforced by vertical plates 14.

The stator member itself rests on spring supports which are secured to the foot members 12, and in the particular embodiment shown, six spring supports are provided on each side of the machine, as shown in Fig. 1. All of the spring supports are of identical construction, which is shown in detail in Fig. 3. Each spring support is contained in a generally cylindrical housing 15 which is welded or otherwise rigidly secured to a cup-shaped base 16. The base 16 rests on the upper plate 13 of the foot member 12 and is secured thereto by bolts 17, shims 18 being preferably interposed between the foot member 12 and the base 16 to adjust the vertical position of the spring support. A generally cup-shaped lower spring retainer 19 is disposed in the bottom of the housing 15, and a spindle 20 is threaded into the retainer 19 and extends vertically upward through an opening 21 in the frame foot 7. A compression spring 22 is disposed within the housing 15 and engages a washer 23 which rests in the lower spring retainer 19. An upper spring retainer 24 engages the upper end of the spring 22 and has an upwardly extending flange portion 25 which extends out of the upper end of the housing 15. The spring 22 has been shown as a double or compound spring, but it will be apparent that any suitable type of compression spring having sufficient mechanical strength might be used. An annular member 26 is placed on the upper end of the housing 15 and secured in place by means of bolts 27' threaded into the base member 16. The inner periphery of the annular member 26 overlaps the upper spring retainer 24 so as to limit its upward movement, the annular member 26 being spaced a small distance from the retainer in the normal equilibrium position of the stator member 1, as shown in Fig. 3.

A ring member 27 is positioned between the frame foot 7 and the flange portion 25 of the upper spring retainer 24, so as to engage the flange portion 25 in the normal position of the stator member. An annular plate 28 is placed on the upper surface of the frame foot 7, and the plate 28 and ring 27 are secured to the frame foot 7 by means of bolts 29 which pass through the plate 28 and frame foot 7 and are threaded into the ring 27. As previously stated, the spindle 20 extends upward through the ring 27, the opening 21 in the frame foot 7 and the annular plate 28. A large nut 30 is threaded on the upper end of the spindle and positioned by means of a spacing sleeve 31, the lower end of which engages a central boss on the lower spring retainer 19. The nut 30 is positioned by means of the sleeve 31 so that it is normally spaced from the annular plate 28 by substantially the same distance as the spacing between the annular member 26 and the upper spring retainer 24. The nut 30 is locked in position by means of a castle nut 32 threaded on the spindle, or by any other suitable means. The parts of the assembly above the frame foot 7 are accessible through openings 33 in the upper cover member 5, these openings being preferably closed by a removable cover 34 in normal operation.

Figure 3:
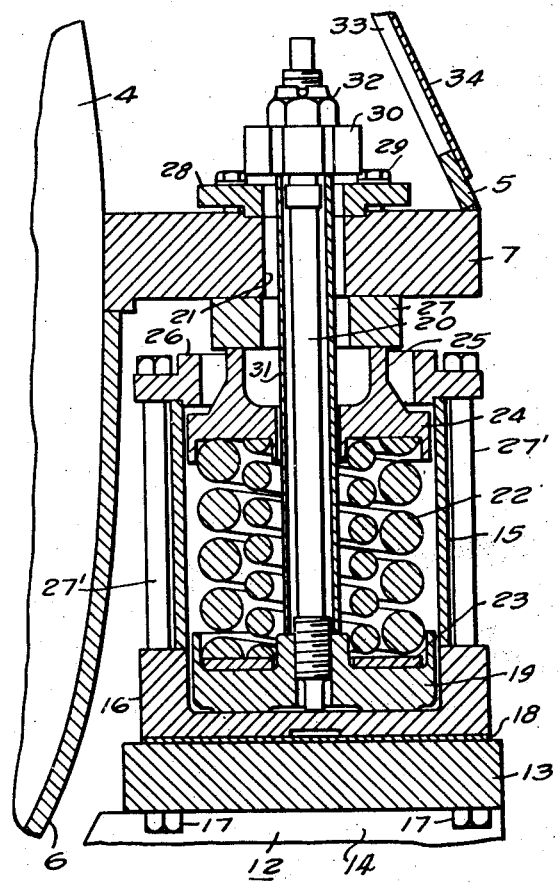
Fig. 3 is a fragmentary transverse sectional view, on an enlarged scale, approximately on the line III—III of Fig. 1.
Figure 4:
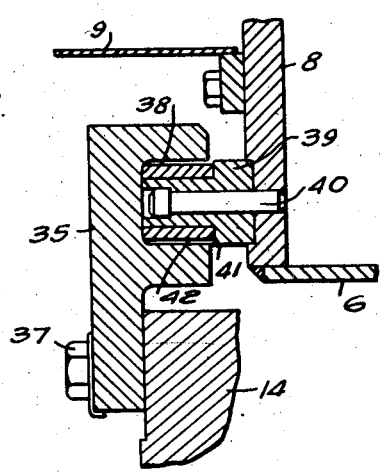
Fig. 4 is a fragmentary sectional view, on an enlarged scale, approximately on the line IV—IV of Fig. 1.

The normal position of the parts is shown in Fig. 3. It will be apparent that the stator member 1 is supported on the foot member 12 by the springs 22 of the six spring supports on each side. Upon the occurrence of a high torque resulting from a suddenly applied short-circuit, or other heavy load, the torque reaction tends to rotate the stator member 1. If the direction of rotation is such that the frame foot 7 in Fig. 3 tends to move downwardly, it will be seen that the spring 22 is compressed between the upper and lower retainers 24 and 19, so that limited movement of the stator member is permitted. Thus, the force is cushioned, and partially absorbed by the internal damping in the spring, so that a relatively reduced force is transmitted to the supporting structure, and the supporting structure is protected from impact stresses. If the torque reaction is such that the frame foot 7 tends to move upward, the stator member 1 moves freely for a short distance until the annular plate 28 engages the nut 30. At the same time, the spring 22 forces the upper retainer 24 upwards until it engages the annular member 26, which prevents further upward movement of the spring retainer. As the frame foot 7 continues to move upward, the spindle 20 is moved vertically with it, carrying the lower spring retainer 19 upwards, and compressing the spring 22 between the retainers 19 and 24.

Thus, the springs 22 on both sides of the machine are compressed in either direction of movement of the stator, and cushion and absorb the force applied to them in either direction of movement. It will be apparent, therefore, that the supporting structure is protected from the application of impact stresses resulting from transient torques, or sudden torque reversals, in the generator. The actual amount of movement of the stator member is, of course, relatively small. Thus, even in a large machine, under a high torque, the total movement of the stator does not exceed one inch.

Since the stator member 1 is supported on springs which permit limited movement of the stator, it will be apparent that changes in the airgap might occur if the stator movement were not guided. Thus, the stator would be free to move vertically, if restrained only by the spring supports, and the magnetic forces acting on the the stator, as well as the movements resulting from torque reactions, might cause changes in the airgap. For this reason, guide means are provided to restrict the movement of the stator member to rotary movement only, so as to maintain a constant airgap and prevent vertical movement of the stator member.

Figure 2:
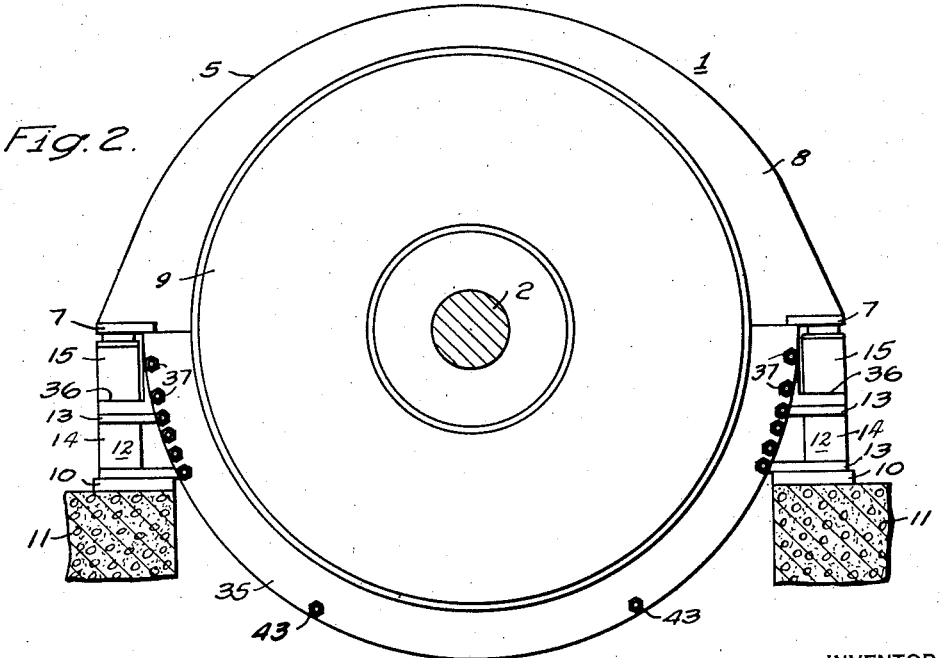
Fig. 2 is an end view of the machine of Fig. 1.

In the preferred embodiment of the invention shown in the drawing, the guide means includes arcuate guide members 35, which are secured to the stationary supporting structure at each end of the machine. As shown in Figs. 1 and 2, angle members 36 are welded, or otherwise secured, to both ends of the upper plate 13 of each of the foot members 12, and the guide members 35 are secured to the angle members 36, and to the end plates 14 of each of the foot members 12, by means of bolts 37. The guide members 35 extend over about one-half the circumference of the stator member 1, and each of the guide members has an arcuate recess or channel 38 in it which is concentric with the stator member 1. A cooperating guide member or rib 39 is secured to the end ring 8 of the stator member 1 at each end, by bolts 40. Each of the members 39 is an arcuate guide member concentric with the stator member 1 and having the same radius as the channel 38 in the corresponding guide member 35. The members 39 engage in the channels 38 of the guide members 35 and are of substantially the same thickness as the width of the channels, so as to fit snugly in the channels with a sliding fit. If desired, liners 41, of bronze or other suitable bearing material, may be secured to each side of the ribs 39, and grooves 42 for the reception of grease may be provided at intervals in the liners 41. It will be seen that the cooperating guide members 35 and 39 prevent vertical movement of the stator member and restrict its movement to rotary movement so as to maintain a constant airgap. The guide members 35 may be secured together at their lower parts by tie rods 43 to maintain uniform spacing and accurate positioning of the guide members.

It should now be apparent that a construction has been provided for dynamo-electric machines which are subject to high transient torques, or abrupt torque reversals, in which the torque reactions are cushioned and absorbed by a spring mounting so that the application of undesirable impact stresses to the supporting structure is prevented. The spring supports, which carry most of the weight of the stator member, permit limited movement of the stator, so that the torque reaction can be absorbed by the damping in the spring supports. A type of spring mounting is shown which has considerable internal damping, and if desired, increased damping action could be obtained by filling the spring housing 15 with oil. The guide means prevent undesired translational movement of the stator member, and restrict it to rotary movement, thus preventing changes in the airgap. The guide means preferably carry only a small part of the weight of the stator member, and function primarily to restrict and guide its movement.

A preferred embodiment of the invention has been shown and described for the purpose of illustration, but it will be apparent that various other modifications and embodiments are possible within the scope of the invention. It is to be understood therefore that the invention is not limited to the specific details of construction shown, but in its broadest aspects, it includes all equivalent embodiments and modifications which come within the scope of the appended claims.

I claim as my invention:

1. A dynamo-electric machine having a stator member and a rotor member, stationary supporting means for said machine, spring means for mounting the stator member on said supporting means to permit limited movement of the stator member relative to the supporting means, and guide means for restricting movement of the stator member to rotary movement.

2. A dynamo-electric machine having a stator member and a rotor member, stationary supporting means for said machine, spring means for mounting the stator member on said supporting means to permit limited movement of the stator member relative to the supporting means, a stationary arcuate guide, and an arcuate member mounted on the stator member, said arcuate member cooperating with said guide member to restrict movement of the stator member to rotary movement.

3. A dynamo-electric machine having a stator member and a rotor member, stationary supporting means for said machine, a plurality of spring mounting means on said supporting means on each side of the machine, said stator member being secured to said spring mounting means and supported thereby for limited movement relative to the supporting means, and guide means for restricting movement of the stator member to rotary movement.

4. A dynamo-electric machine having a stator member and a rotor member, stationary supporting means for said machine, a plurality of spring mounting means on said supporting means on each side of the machine, said stator member being secured to said spring mounting means and supported thereby for limited movement relative to the supporting means, a stationary arcuate guide, and an arcuate member on the stator member, said arcuate member cooperating with said guide member to restrict movement of the stator member to rotary movement.

5. A dynamo-electric machine having a stator member and a rotor member, stationary supporting means for said machine, a plurality of spring mounting means on said supporting means on each side of the machine, each of said spring mounting means including a central spindle, a lower spring retainer member secured to the spindle, a compression spring engaging said lower spring retainer member, an upper spring retainer member engaging the upper end of the spring, said spindle extending through an opening in a portion of the stator member which overlies the upper spring retainer member, and the spindle having means for engaging the upper side of said portion of the stator member, whereby the spring mounting means support the stator member for limited movement in either direction relative to the stationary supporting means, and guide means for restricting movement of the stator member to rotary movement.

6. A dynamo-electric machine having a stator member and a rotor member, stationary supporting means for said machine, a plurality of spring mounting means on said supporting means on each side of the machine, each of said spring mounting means including a central spindle, a lower spring retainer member secured to the spindle, a compression spring engaging said lower spring retainer member, an upper spring retainer member engaging the upper end of the spring, said spindle extending through an opening in a portion of the stator member which overlies the upper spring retainer member, and the spindle having means for engaging the upper side of said portion of the stator member, whereby the spring mounting means support the stator member for limited movement in either direction relative to the stationary supporting means, an arcuate guide member on the supporting means, and an arcuate member on the stator member engaging said guide member to restrict movement of the stator member to rotary movement.

RENÉ A. BAUDRY.

No references cited.